(12) United States Patent
Paterson

(10) Patent No.: US 11,849,498 B2
(45) Date of Patent: Dec. 19, 2023

(54) COMMUNICATION SYSTEM

(71) Applicant: NEC CORPORATION, Tokyo (JP)

(72) Inventor: Robert Paterson, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/973,885

(22) PCT Filed: Jun. 20, 2019

(86) PCT No.: PCT/JP2019/024480
§ 371 (c)(1),
(2) Date: Dec. 10, 2020

(87) PCT Pub. No.: WO2019/244974
PCT Pub. Date: Dec. 26, 2019

(65) Prior Publication Data
US 2021/0259038 A1    Aug. 19, 2021

(30) Foreign Application Priority Data

Jun. 22, 2018 (GB) ..................... 1810341

(51) Int. Cl.
*H04W 76/27* (2018.01)
*H04L 5/00* (2006.01)
*H04W 88/08* (2009.01)

(52) U.S. Cl.
CPC ........... *H04W 76/27* (2018.02); *H04L 5/0055* (2013.01); *H04W 88/08* (2013.01)

(58) Field of Classification Search
None
See application file for complete search history.

(56) References Cited

U.S. PATENT DOCUMENTS 10,798,624 B2 * 10/2020 Byun ..................... H04W 36/08
2018/0213589 A1 * 7/2018 Wu ......................... H04W 76/20
(Continued)

FOREIGN PATENT DOCUMENTS

| AU | 2011253859 A1 | 1/2012 |
| EP | 2 983 407 A1 | 2/2016 |

(Continued)

OTHER PUBLICATIONS

"NGMN 5G White Paper", Next Generation Mobile Networks V1.0, Feb. 17, 2015, 125 pages.

(Continued)

*Primary Examiner* — Michael J Moore, Jr.
*Assistant Examiner* — Gautam Sharma

(57) ABSTRACT

There is presented a method performed by a central unit of a distributed base station apparatus in a cellular communication system, as part of a change of a UE context from a source distributed unit to a target distributed unit. A first message is sent to the target distributed unit of the distributed base station apparatus. A second message is received, from the target distributed unit of the distributed base station apparatus. The second message includes configuration information for the target distributed unit which may be full or delta. A third message is sent to a further base station apparatus that contains the received configuration information for the target distributed unit and an indication of whether a full or a delta type of configuration, has been used.

4 Claims, 8 Drawing Sheets

(56) References Cited

U.S. PATENT DOCUMENTS

| | | | | |
|---|---|---|---|---|
| 2018/0368205 | A1* | 12/2018 | Park | H04W 76/34 |
| 2019/0222291 | A1* | 7/2019 | Wang | H04W 88/085 |
| 2019/0223251 | A1 | 7/2019 | Jiang et al. | |
| 2019/0253937 | A1* | 8/2019 | Hsieh | H04W 36/0061 |
| 2019/0281650 | A1* | 9/2019 | Wu | H04W 36/0072 |
| 2019/0305915 | A1* | 10/2019 | Zhu | H04L 5/0035 |
| 2019/0373519 | A1* | 12/2019 | Yiu | H04W 36/0069 |
| 2020/0092933 | A1* | 3/2020 | Takahashi | H04W 12/043 |
| 2020/0128454 | A1* | 4/2020 | Teyeb | H04W 36/0069 |
| 2020/0154499 | A1* | 5/2020 | Futaki | H04W 8/22 |
| 2020/0336364 | A1* | 10/2020 | Takahashi | H04W 76/19 |
| 2020/0383020 | A1* | 12/2020 | Liu | H04W 36/0011 |
| 2020/0396784 | A1* | 12/2020 | Toeda | H04W 76/15 |
| 2021/0068103 | A1* | 3/2021 | Toeda | H04W 72/0453 |
| 2021/0092629 | A1* | 3/2021 | Fang | H04W 48/08 |
| 2021/0227382 | A1* | 7/2021 | Wifvesson | H04W 76/27 |
| 2021/0227435 | A1* | 7/2021 | Hsieh | H04W 36/08 |
| 2021/0258214 | A1* | 8/2021 | Toeda | H04L 41/0813 |
| 2021/0258218 | A1* | 8/2021 | Toeda | H04L 41/0886 |
| 2021/0259038 | A1* | 8/2021 | Paterson | H04L 5/0055 |
| 2021/0344716 | A1* | 11/2021 | Wu | H04L 63/0435 |
| 2021/0385867 | A1* | 12/2021 | Futaki | H04W 74/0833 |

FOREIGN PATENT DOCUMENTS

| | | |
|---|---|---|
| EP | 3 277 020 A1 | 1/2018 |
| WO | 2008/157717 A1 | 12/2008 |
| WO | 2018/030819 A1 | 2/2018 |
| WO | 2018/053852 A1 | 3/2018 |
| WO | 2018/144758 A1 | 8/2018 |

OTHER PUBLICATIONS

"3rd Generation Partnership Project; Technical Specification Group Radio Access Network; NR; Radio Resource Control (RRC) protocol specification(Release 15)", 3GPP TS 38.331 V15.1.0, Mar. 2018, 268 pages.

"3rd Generation Partnership project; Technical specification Group Radio Access Network; Evolved Universal Terrestrial Radio Access Network (E-UTRAN); X2 application protocol (X2AP) (Release 15)", 3GPP TS 36.423 V15.1.0, Mar. 2018, 354 pages.

"3rd Generation Partnership Project; Technical Specification Group Radio Access Network; NG-RAN; Architecture description (Release 15)", 3GPP TS 38.401 V15.2.0, Jun. 2018, 39 pages.

Huawei, "Support of delta signaling during MN initiated SN change", 3GPP TSG RAN WG3 Meeting #97bis, R3-173912, Oct. 9, 2017-Oct. 13, 2017, 5pages.

Catt, "TP for 36.423 on bearer type change", 3GPP TSG-RAN WG3 Meeting #98, R3-174548, Nov. 27, 2017-Dec. 1, 2017. 15 pages.

United Kingdom Search Report for GB1810341.6 dated Nov. 28, 2018.

International Search Report for PCT/JP2019/024480 dated Oct. 22, 2019 [PCT/ISA/210].

Written Opinion for PCT/JP2019/024480 dated Oct. 22, 2019 [PCT/ISA/237].

JP Office Anion for JP Application No. 2020-573998. dated Aug. 23, 2022 with English Translation.

Catt, 3GPP TSG RAN WG3 #99b R3-182355, Apr. 9, 2018, pp. 1-4.

Catt, 3GPP TSG RAN WG3 #99b R30181791, Apr. 9, 2018, pp. 1-3.

Japanese Office Action for JP Application No. 2020-570998 dated Feb. 22, 2022 with English Translation.

3rd Generation Partnership project, Technical Specification Group Radio Access Network; Evolved Universal Terrestrial Radio Access (E-UTRA) and NR; Multi-connectivity; Stage 2: (Release 15), 3GPP TS 37.340 V15.2.0 (Jun. 2018), Jun. 20, 2018.

Nokia, Nokia Shanghai Bell, Ericsson, Addition of the full config indicator, 3GPP TSG RAN WG3 #100, R3-183364, May 28, 2018.

NEC, Full Configuration Indication over X2 for EN-DC, 3GPP TSG RAN WG3 AH-1807, R3-183923, Jun. 26, 2018.

Nokia, Nokia Shanghai Bell, Ericsson, Addition of the full config indicator in SN Change, 3GPP TSG RAN WG3 #100, R3-183365, May 28, 2018.

\* cited by examiner

COMMUNICATION SYSTEM

TECHNICAL FIELD

The present invention relates to mobile communications devices and networks, particularly but not exclusively those operating according to the 3rd Generation Partnership Project (3GPP) standards or equivalents or derivatives thereof. The invention has particular although not exclusive relevance to Dual Connectivity (DC) configurations in the so-called 'fourth generation', '4G' (or 'LTE') systems, 'fifth generation', '5G' (or 'Next Generation'/'New Radio') systems, and derivatives and hybrid configurations of such systems. The invention relates particularly but not exclusively to Multi-Radio Access Technology (multi-RAT) Dual Connectivity (MR-DC) configurations such as Evolved UMTS Terrestrial Radio Access (E-UTRA) New Radio (NR) Dual Connectivity (EN-DC) and other similar configurations.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services such as Machine Type Communications (MTC), Internet of Things (IoT) communications, vehicular communications and autonomous cars, high resolution video streaming, smart city services, and/or the like. Accordingly, 5G technologies are expected to enable network access to vertical markets and support network (RAN) sharing for offering networking services to third parties and for creating new business opportunities. 3GPP intends to support 5G by way of the so-called 3GPP Next Generation (NextGen) radio access network (RAN) and the 3GPP NextGen core (NGC) network (also referred to as the '5G Core' (5GC)). Various details of 5G networks are described in, for example, the 'NGMN 5G White Paper' V1.0 by the Next Generation Mobile Networks (NGMN) Alliance, which document is available from https://www.ngmn.org/5g-white-paper.html.

In order to access the wider communication network, user communication devices (user equipment or 'UEs') connect to the network (4G and/or 5G) via radio access network (RAN) equipment comprising one or more base stations. A base station associated with a 4G network is typically referred to as an evolved NodeB ('eNB') whereas a base station associated with a 5G network may be referred to as a New Radio Base Station ('NR-BS') or as a 'gNB'. It will be appreciated, however, that such RAN apparatus/base stations may be referred to using alternative terms. For example a 5G base stations may sometimes be referred to as eNBs (or 5G/NR eNB) which is more typically associated with LTE base stations. The functionality of a gNB (referred to herein as a 'distributed' gNB) may be split between one or more distributed units ('DUs' or 'gNB-DUs') and a central unit ('CU' or 'gNB-CUs'), with a CU typically performing higher level functions and communication with the next generation core and with the DU performing lower level functions and communication over an air interface with user equipment (UE) in the vicinity (i.e. in a cell operated by the gNB).

Recently, discussions have been ongoing with respect to 'multi-connectivity' operation using E-UTRA and NR radio access technologies, i.e. how base stations of fourth and fifth generations should interact with one another when providing cellular access, for user equipment, to their respective core networks. Such 'multi-connectivity' scenarios may include Multi-RAT Dual Connectivity (MR-DC) scenarios. In these scenarios, for example, at least one 4G base station and at least one 5G base station are configured to serve a UE. One of the base stations in such a scenario provides control plane signalling (and possibly user plane signalling also) and may be termed the 'master' base station. Each other base station provides user plane signalling and may be termed a 'secondary' base station, though other terms may be used, such as 'master node (MN)' and 'secondary node (SN)'. Several MR-DC scenarios are possible including:

E-UTRA-NR Dual Connectivity (EN-DC)—which is where the 'master' base station (MN) is a 4G base station (master eNB or 'MeNB') and the secondary base station (SN) is a 5G base station (secondary gNB or 'SgNB'). In this situation, the gNB is sometimes referred to as en-gNB, because it provides NR user plane and control plane protocol terminations towards the UE, and acts as secondary node in EN-DC. The base stations are connected via a base station to base station interface, such as an X2 interface. The UE's control plane traffic will terminate in the master base station's core network (in this scenario at an EPC communication entity such as a mobility management entity, MME, associated with the MeNB) via a base station-core network control plane interface, such as the S1-C or S1-MME interface. The UE's user plane traffic will also terminate in the MeNB's core network (e.g. at a serving gateway 'S-GW') via one or more base station-core network user plane interfaces, such as the S1-U interface. Depending on configuration, both the MeNB and SgNB may each have a respective S1-U interface with the core network, or only the MeNB may have an S1-U interface.

NG-RAN E-UTRA-NR Dual Connectivity (NGEN-DC)—which is where the 'master' base station (MN) is a 4G base station (master eNB or 'MeNB') and the secondary base station (SN) is a 5G base station (secondary gNB or 'SgNB'). In this scenario, however, the MeNB is connected to the 5GC via a 5G user plane interface (e.g. 'NG-U') and a 5G control plane interface (e.g. 'NG-C'). The base stations are connected via a base station to base station interface, such as an Xn interface. The UE's control plane traffic will terminate at a 5G core network entity (e.g. the access and mobility function, AMF) via an appropriate interface (e.g. the NG-C interface) with the MeNB. The UE's user plane traffic will also terminate in the 5G core network via one or more base station-core network user plane interfaces, such as the NG-U interface. Depending on configuration, both the MeNB and SgNB may each have a respective NG-U interface with the core network, or only the MeNB may have an NG-U interface.

NR-E-UTRA Dual Connectivity (NE-DC)—which is where the 'master' base station (MN) is a 5G base station (master gNB or 'MgNB') and the secondary base station (SN) is a 4G base station (secondary eNB or 'SeNB'). In this situation, the SeNB may be referred to as a secondary ng-eNB. The base stations are connected via a base station to base station interface, such as an Xn interface. The UE's control plane traffic will terminate at a 5G core network entity (e.g. the access and mobility function, AMF) via an appropriate interface (e.g. the NG-C interface) with the MgNB. The UE's user plane traffic will also terminate in the 5G core network via one or more base station-core network user plane interfaces, such as the NG-U interface. Depending on configuration, both the MgNB and SeNB may each have a respective NG-U interface with the core network, or only the MgNB may have an NG-U interface.

In the context of MR-DC, there have been ongoing discussions related to the issue of how to efficiently and effectively provide, to other communication entities in the wider communication network, an accurate and up-to-date indication of the radio configurations being employed at base stations (and in particular for gNBs/gNB-DUs) for the UE(s) that they serve.

A Radio Resource Control (RRC) message (e.g. an RRC Connection Reconfiguration message) is sent to the UE to provide the appropriate configuration information for a group of cells operating under the master node in the MR-DC configuration. For EN-DC, in the context of distributed gNBs, this RRC message consists of information generated by an en-gNB-CU and information generated by an en-gNB-DU. This information comprises cell group configuration information which is typically signalled in a dedicated information element (e.g. the 'CellGroupConfig' IE).

In general, the configuration information may be provided (e.g. in RRC messages) as a 'full' configuration or a 'delta' configuration. A 'full' configuration provides all the required configuration information whereas a 'delta' configuration provides details of only those configurations that have changed since an earlier configuration was provided. Typically, when an EN-DC configuration is first set up, the first message of the procedure providing configuration information includes a full configuration, and subsequent messages providing configuration information (e.g. following modifications to the configuration information) are delta configurations. For example, if a data bearer is added, the gNB-DU typically changes some of the configuration information and provides details of the changed information in the CellGroupConfig IE, as a delta configuration.

Delta configurations are generally preferable from the point of view of message size. However, full configurations ensure that any incorrect configuration parameter values that are being applied (e.g. because earlier delta/full configuration information has been missed or misapplied) are reset to the correct values.

SUMMARY OF INVENTION

However, it is apparent that the current mechanisms for providing configuration information in MR-DC scenarios do not currently allow certain procedures to be performed effectively. For example, during mobility procedures performed between different gNB-DUs the current mechanisms for providing configuration information may not always allow the master node to correctly, or efficiently, treat the configuration information resulting in either unsuccessful or in incorrect completion of the procedure.

The present invention aims to provide methods, apparatus and a communication system that address or at least partially ameliorate the above issues.

The present invention is set out in the appended independent claims. Optional features are set out in the appended dependent claims.

According to one example aspect of the present invention there is provided, a method performed by a central unit of a distributed base station apparatus in a cellular communication system, as part of a change of a user equipment, 'UE', context from a source distributed unit of the distributed base station apparatus to a target distributed unit of the distributed base station apparatus, the method comprising: sending, to the target distributed unit of the distributed base station apparatus, a first message; receiving, from the target distributed unit of the distributed base station apparatus, a second message that includes at least one information element, 'IE', comprising configuration information for the target distributed unit, wherein the at least one information element comprises at least one of: full configuration information for a current configuration applied at the target distributed unit; and delta configuration information for a current configuration applied at the target distributed unit, the delta configuration information representing changes between the current configuration applied at the target distributed unit and another configuration; and sending, to a further base station apparatus, a third message containing the received configuration information for the target distributed unit and an indication of whether a full or a delta type of configuration, has been used.

According to one example aspect of the present invention there is provided, a method performed by a base station apparatus of a cellular communication system, as part of a procedure to change a user equipment, 'UE', context from a source distributed unit of a distributed base station apparatus to a target distributed unit of the distributed base station apparatus, the method comprising: receiving, from the target distributed unit, a message containing configuration information for the target distributed unit and an indication of whether a full or a delta type of configuration, has been used; and performing a reconfiguration procedure, with the UE, using the received configuration information and the indication.

According to one example aspect of the present invention there is provided, a central unit of a distributed base station apparatus in a cellular communication system, the central unit comprising: means for sending, as part of a change of a user equipment, 'UE', context from a source distributed unit of the distributed base station apparatus to a target distributed unit of the distributed base station apparatus, to the target distributed unit of the distributed base station apparatus, a first message; means for receiving, from the target distributed unit of the distributed base station apparatus, a second message that includes at least one information element, 'IE', comprising configuration information for the target distributed unit, wherein the at least one information element comprises at least one of: full configuration information for a current configuration applied at the target distributed unit; and delta configuration information for a current configuration applied at the target distributed unit, the delta configuration information representing changes between the current configuration applied at the target distributed unit and another configuration; and means for sending, to a further base station apparatus, a third message containing the received configuration information for the target distributed unit and an indication of whether a full or a delta type of configuration, has been used.

According to one example aspect of the present invention there is provided, a base station apparatus, for a cellular communication system, wherein the base station apparatus comprises: means for receiving during a procedure to change a user equipment, 'UE', context from a source distributed unit of a distributed base station apparatus to a target distributed unit of the distributed base station apparatus, from the target distributed unit, a message containing configuration information for the target distributed unit and an indication of whether a full or a delta type of configuration, has been used; and means for performing a reconfiguration procedure, with the UE, using the received configuration information.

Example aspects of the invention extend to corresponding systems, apparatus, and computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

Although for efficiency of understanding for those of skill in the art, the invention will be described in detail in the context of a 3GPP system (5G networks), the principles of the invention can be applied to other systems in which slice scheduling is performed.

Under the 3GPP standards, a NodeB (or an 'eNB' in LTE, 'gNB', in 5G) is a base station via which communication devices (user equipment or 'UE') connect to a core network and communicate to other communication devices or remote servers. Communication devices might be, for example, mobile communication devices such as mobile telephones, smartphones, smart watches, personal digital assistants, laptop/tablet computers, web browsers, e-book readers, and/or the like. Such mobile (or even generally stationary) devices are typically operated by a user (and hence they are often collectively referred to as user equipment, 'UE') although it is also possible to connect IoT devices and similar MTC devices to the network. For simplicity, the present application will use the term base station to refer to any such base stations and use the term mobile device or UE to refer to any such communication device.

BRIEF DESCRIPTION OF DRAWINGS

Example embodiments of the invention will now be described, by way of example, with reference to the accompanying drawings in which.

DESCRIPTION OF EMBODIMENTS

Overview

Figure 1:
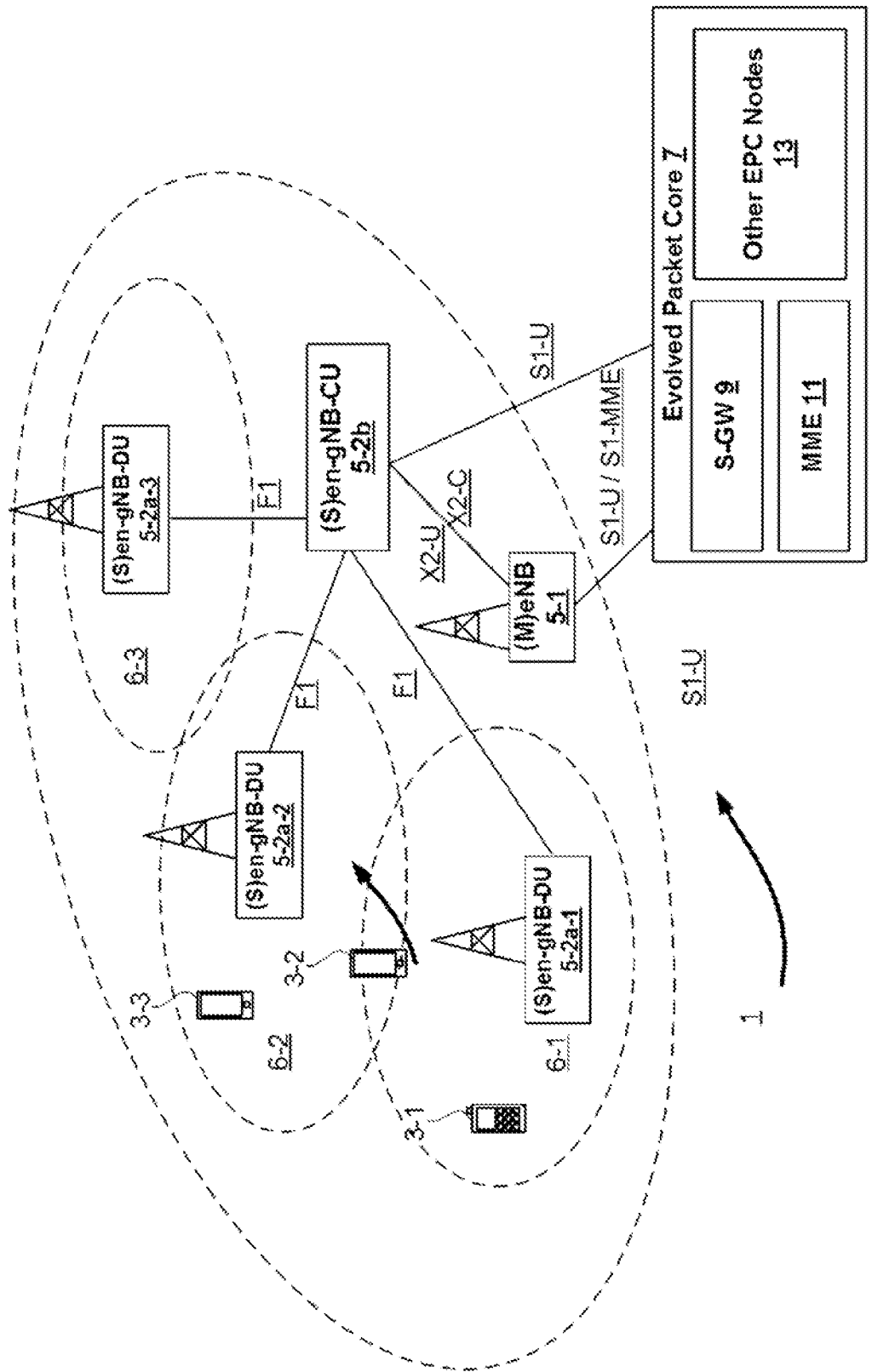
FIG. 1 illustrates schematically a mobile (cellular or wireless) telecommunication system to which example embodiments of the invention may be applied.

FIG. 1 illustrates schematically a mobile (cellular or wireless) telecommunication system 1 to which example embodiments of the invention may be applied.

In the telecommunication system 1, items of user equipment (UEs) 3-1, 3-2, 3-3 can communicate with one another and other UEs via respective base stations 5-1, 5-2 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst three mobile devices 3 and two base stations 5 are shown in FIG. 1 for illustration purposes, the system, when implemented, will typically include other base stations and UEs.

The core network 7, in this example, comprises an evolved packet core (EPC) and includes a number of core network nodes or functions for supporting communication in the telecommunication system 1. The core network nodes include, amongst other things, a serving gateway (S-GW) 9 and a mobility management entity (MME) 11.

The base stations 5 include a base station (gNB) 5-2 configured to operate in accordance with next generation (5G) standards and a base station (eNB) 5-1 configured to operate in accordance with 4G standards. In this example, the gNB 5-2 comprises a distributed gNB 5-2 having a central unit (gNB-CU) 5-2b and a plurality of distributed units (gNB-DUs) 5-2a-1 to 5-2a-3 each of which serves at least one associated cell 6-1 to 6-3 respectively. The central and distributed units of the gNB 5-2 communicate with one another over a dedicated interface (known as the F1 or F1 application protocol 'F1AP' interface).

The base stations are configured in an EN-DC configuration in which the eNB 5-1 acts as a 'master' base station (MeNB) and the gNB 5-2 acts as a secondary base station (SgNB). In FIG. 1, the gNB 5-2 is therefore referred to as en-gNB (and the corresponding central unit and distributed unit referred to as an en-gNB-CU and en-gNB-DU respectively). The secondary gNB-CU 5-2b and master eNB 5-1 are connected via a base station to base station interface (in this example an X2 interface providing control plane, X2-C, and user plane, X2-U, communication). The UE's control plane traffic will terminate in the master eNB's core network 7 (e.g. at the MME 11) via a base station-core network control plane interface (in this example an S1-MME interface). The UE's user plane traffic will also terminate in the master eNB's core network (e.g. at the S-GW 9) via one or more base station-core network user plane interfaces, such as the S1-U interface. In this example both the master eNB 5-1 and central unit of the secondary gNB 5-2 (en-gNB-CU 5-2) have a respective S1-U interface with the core network 7.

Each UE 3 and its serving base station (or serving base station distributed unit) 5 are connected via an appropriate air interface (for example the so-called 'Uu' interface and/or the like).

As the UEs 3 move within the communication system 1 there may be instances where the there is a change in the distributed unit 5-2a of the en-gNB 5-2 (referred to as inter-DU mobility). For example, UE 3-2 in FIG. 1 is shown moving from cell 6-1 to cell 6-2 resulting in mobility being triggered at the central unit CU 5-2b of the en-gNB 5-2 from the en-gNB-DU 5-2a-1 (acting as a source DU) to en-gNB-DU 5-2a-2 (acting as a target DU). This change typically requires a change in the cell group configuration information that needs to be delivered to the UE for successful communication via the target en-gNB-DU 5-2a-2. This new cell group configuration information is generated at the target gNB-DU 5-2a-2, when requested by the gNB-CU 5-2b to set up an appropriate UE context, and provided to the gNB-CU 5-2b either as 'full' or 'delta' cell group configuration information.

However, to enable the configuration information to be treated correctly by the master eNB the gNB-CU 5-2b beneficially provides an indication, of whether the target gNB-DU 5-2a-2 has applied full or partial ('delta') configuration information, to the master eNB 5-1. In this example the indication is provided together with the configuration information in the same message (e.g. an X2AP message such as an 'SgNB Modification Required' message), sent after receipt by the gNB-CU 5-2b of the message from the target gNB-DU 5-2a-2 providing the configuration information (although it will be appreciated that the indication could be sent separately).

Whilst the mobility of UE 3-2 in FIG. 1 is described as being triggered at the central unit CU 5-2b it will be appreciated that a similar mobility procedure may be triggered by the master eNB 5-1 as described in more detail later. This change in DU also would require a potential change in the cell group configuration information that needs to be delivered to the UE for successful communication via the target en-gNB-DU 5-2a-2. Like with CU initiated mobility, this new cell group configuration information is generated at the target gNB-DU 5-2a-2, when requested by the gNB-CU 5-2b to set up an appropriate UE context, and provided to the gNB-CU 5-2b either as 'full' or 'delta' cell group configuration information.

To enable the configuration information also to be treated correctly in the case of master eNB triggered mobility, the gNB-CU 5-2b beneficially provides an indication, of whether the target gNB-DU 5-2a-2 has applied full or partial ('delta') configuration information, to the master eNB 5-1. In this example the indication is provided together with the configuration information in the same message (e.g. an X2AP message such as an 'SgNB Modification Request Acknowledge' message), sent after receipt by the gNB-CU 5-2b of the message from the target gNB-DU 5-2a-2 providing the configuration information (although it will be appreciated that the indication could be sent separately).

Whilst provision of such an indication might be considered unnecessary the inventors have realised that, in the absence of such an indication being provided to the master base station during such mobility procedures, the master base station may not be able to correctly treat the configuration information when a full configuration is applied at the target gNB-DU 5-2a-2 and will not be able to provide a corresponding indication to the UE 3-2 during the RRC reconfiguration procedure.

It will be appreciated that whilst the example of FIG. 1 involves an EN-DC configuration, it will be appreciated that the concepts described in relation to this example may be applied in any of the other MR-DC configurations described in the introduction above. In one of the other MR-DC configurations, for example, the indication of whether the target node has applied full or partial ('delta') configuration information might be provided, during DU-DU mobility, in a different message sent to the master node (which may be a 4G or 5G master node) using an appropriate application protocol (e.g. an XnAP message as opposed to one of the X2AP messages described above).

User Equipment (UE)

Figure 2:
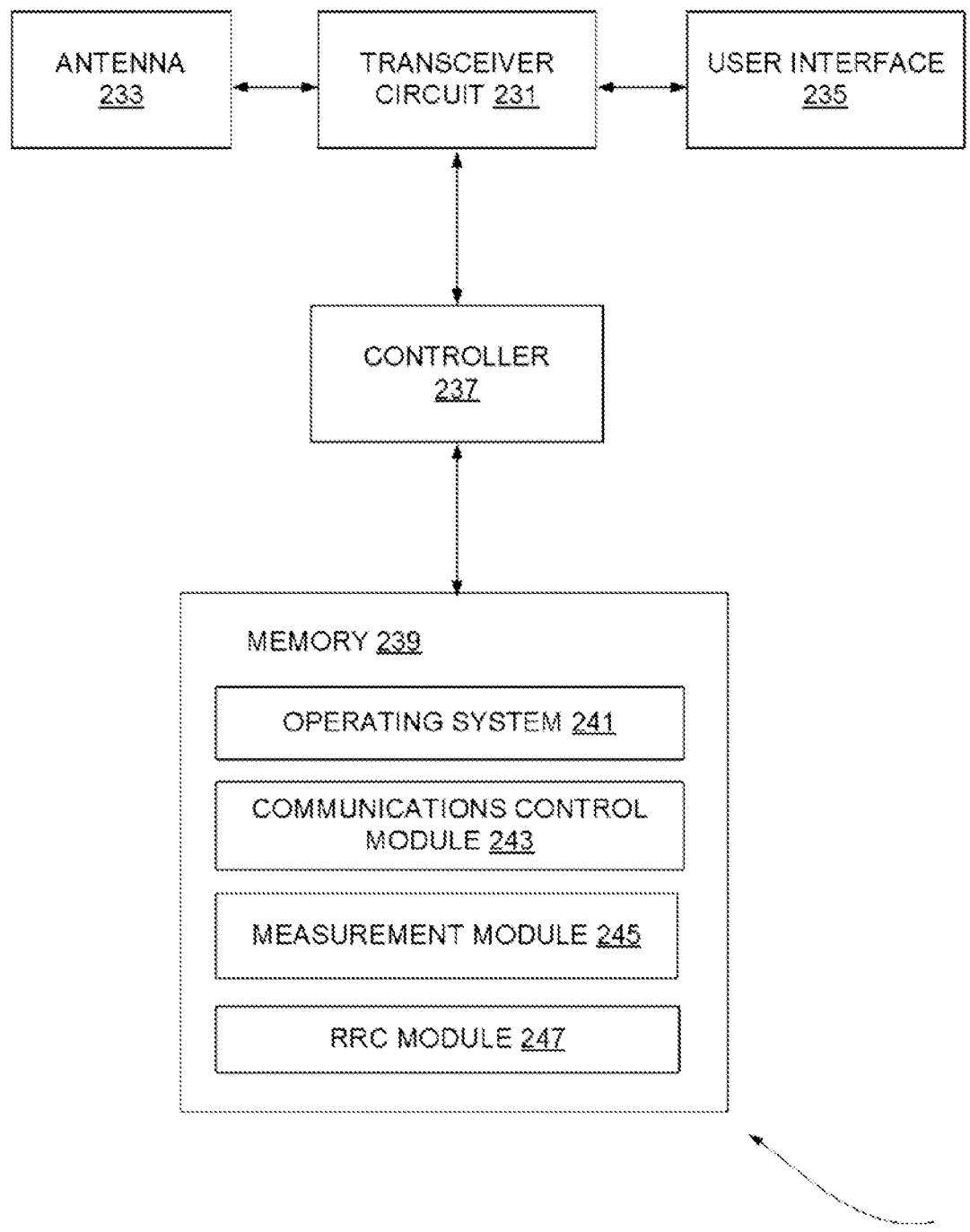
FIG. 2 is a simplified schematic block diagram of a mobile device forming part of the system shown in FIG. 1.

FIG. 2 is a block diagram illustrating the main components of user equipment (UE) 3 suitable for the communication system 1 shown in FIG. 1.

As shown, the UE 3 includes a transceiver circuit 231 which is operable to transmit signals to and to receive signals from the connected node(s) via one or more antenna 233. Although not necessarily shown in FIG. 2, the UE 3 will of course have all the usual functionality of a conventional mobile device (such as a user interface 235) and this may be provided by any one or any combination of hardware, software and firmware, as appropriate.

A controller 237 controls the operation of the UE 3 in accordance with software stored in a memory 239. The software may be pre-installed in the memory 239 and/or may be downloaded via the telecommunication system 1 or from a removable data storage device (RMD), for example. The software includes, among other things, an operating system 241, a communications control module 243, a measurement module 245 and an RRC module 247.

The communications control module 243 is operable to control the communication between the UE 3 and the base stations 5. The communications control module 243 also controls the separate flows of uplink data and control data that are to be transmitted to the base station(s) 5 and the reception of downlink data and control data transmitted by the base station(s) 5. The communications control module 243 is responsible, for example, for managing the UE's part in idle and connected mode procedures such as cell (re) selection, camping on cells, listening for system information, random access channel (RACH) procedures etc.

The measurement module 245 handles the performance of measurements of communication conditions (e.g. received signal power and quality) in the serving and neighbouring cells (e.g. based on measurement configuration and control information received from the base station 5). The measurement module 245 also generates associate measurement reports for transmission to the base station 5

The RRC module 247 is responsible for controlling the RRC layer functionality of the UE 3 (under the overall control of the communications control module 243).

LTE Base Station (eNB)

Figure 3:
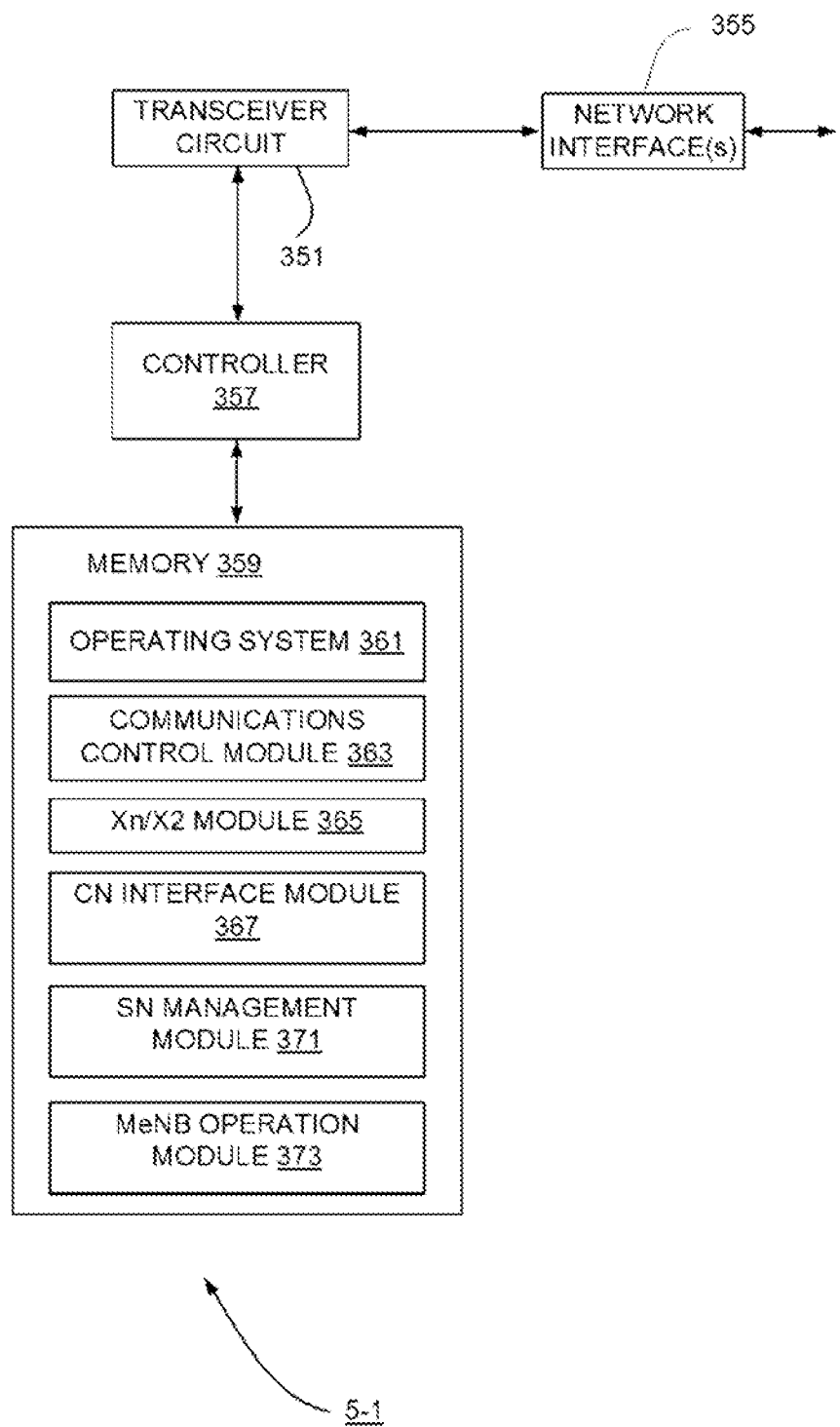
FIG. 3 is a simplified schematic block diagram of an eNB forming part of the system shown in FIG. 1.

FIG. 3 is a block diagram illustrating the main components of the eNB 5-1 (i.e. the MeNB), shown in FIG. 1.

As shown, the eNB 5-1 includes at least one transceiver circuit 351 which is operable to transmit signals to and to receive signals from connected UE(s) 3 via one or more antenna 353 and to transmit signals to and to receive signals from other network nodes (either directly or indirectly) via a network interface 355. The network interface 355 typically includes one or more base station-base station interfaces (such as X2/Xn) and one or more base station-core network interfaces (such as S1/N1/N2/N3).

A controller 357 controls the operation of the base station 5-1 in accordance with software stored in a memory 359. The software may be pre-installed in the memory 359 and/or may be downloaded via the telecommunication network 1 or from a removable data storage device (RMD), for example. The software includes, among other things, an operating system 361, a communications control module 363, a Xn/X2 module 365 a CN interface module 367, a SN management module 371 and an MeNB operation module 373.

The communications control module 363 is responsible for handling (generating/sending/receiving) signalling between the base station 5-1 and other nodes, such as the UE 3 and core network nodes. The communications control module 363 also controls the separate flows of uplink and downlink user traffic and control data to be transmitted to the UEs 3 served by eNB 5-1 (and gNBs operating as secondary gNBs) including, for example, control data for managing operation of the UEs 3.

The communications control module 363 is responsible, for example, for controlling procedures such as the communication of measurement control/configuration information, system information, the eNB's part in random access channel (RACH) procedures etc. The communications control module 363 is also responsible for managing the eNB's part in the setup, configuration and reconfiguration of interfaces with neighbouring base stations 5. The communications control module 363 is also responsible for managing the eNB's part in mobility procedures including making mobility related decisions, selecting targets etc. (where applicable).

The Xn/X2 module 365 is responsible for the management of the eNB's traffic over the base station to base station interface(s) (under the overall control of the communications control module 363) such as X2 traffic between the eNB 5-1 and the en-gNB 5-2 in the EN-DC configuration of FIG. 1 (and/or X2 traffic with any other LTE base stations and/or Xn traffic with a gNB when forming part of an NE-DC or NGEN-DC configuration).

The CN interface module 367 is responsible for the management of the eNB's traffic over the base station to core network interface (under the overall control of the communications control module 363) such as S1-U/S1-C traffic between itself and with the EPC 7 in the EN-DC configuration of FIG. 1 (and/or traffic over the corresponding interface between itself and with the 5GC in NE-DC or NGEN-DC).

The SgNB management module 371 is responsible for managing procedures for interacting with secondary nodes (SNs) when eNB 5-1 is operating as a master eNB (e.g. when configured as the MeNB in the EN-DC configuration of FIG. 1). These procedures may include, for example, SgNB initiated SgNB modification procedures, MeNB initiated SgNB Modification Preparation procedures and/or the like.

The MeNB operation module 373 is responsible for operating the eNB as a master eNB (e.g. when configured as the MeNB in the EN-DC configuration of FIG. 1).

Distributed Base Station (gNB)

Figure 4:
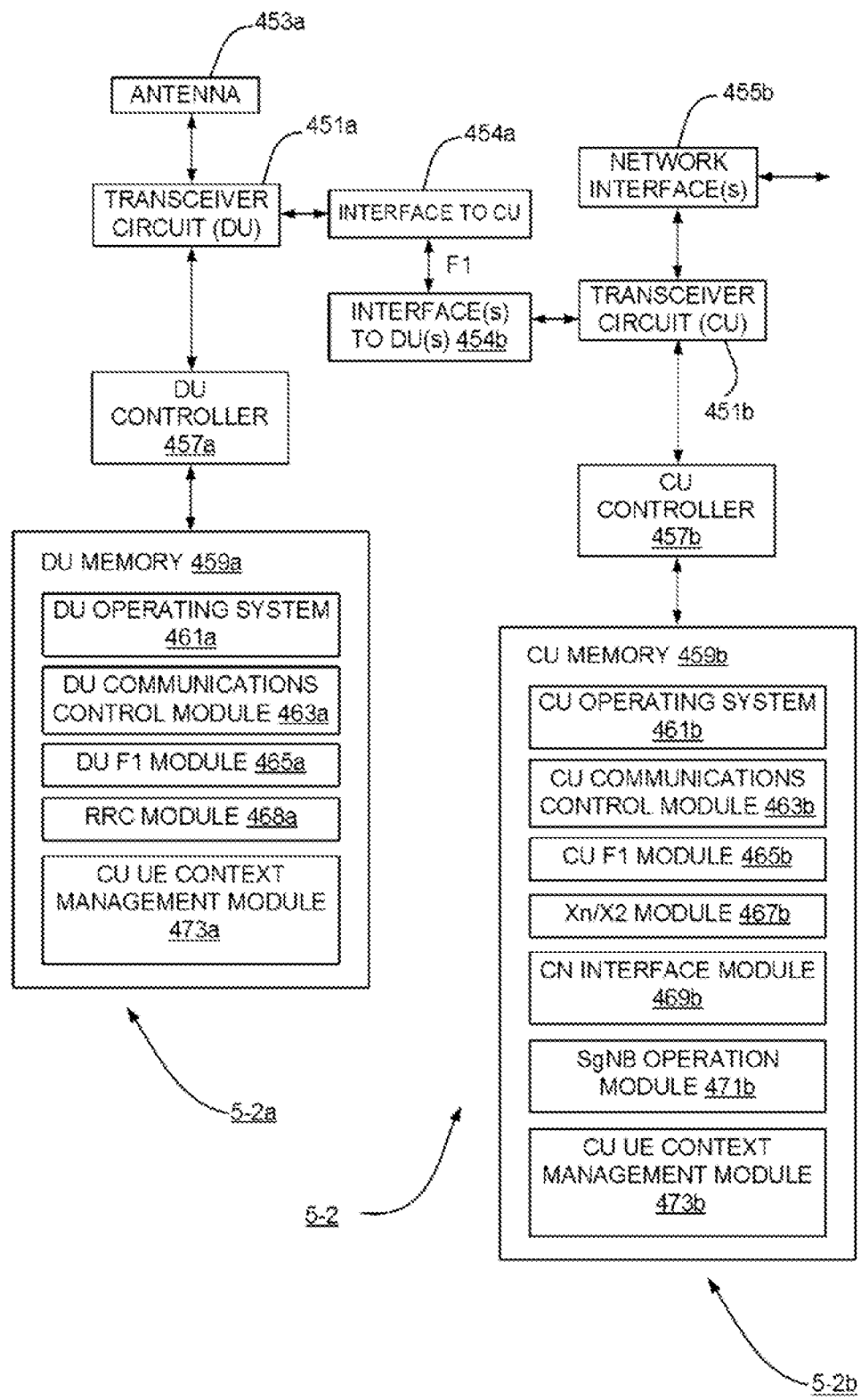
FIG. 4 is a simplified schematic block diagram of a distributed gNB forming part of the system shown in FIG. 1.

FIG. 4 is a block diagram illustrating the main components of a distributed type gNB 5-2 of the type shown in FIG. 1.

As shown, the gNB 5-2 includes at least one distributed unit 5-2a and a central unit 5-2b. Each unit 5-2a, 5-2b includes respective transceiver circuitry 451a, 451b. The distributed unit 5-2a transceiver circuitry 451a is operable to transmit signals to and to receive signals from UEs 3 via one or more antennae 453a and is operable to transmit signals to and to receive signals from the central unit 5-2b via an interface 454a.

The central unit 5-2b transceiver circuitry 451b is operable to transmit signals to and to receive signals from functions of the core network 7 and/or other gNBs 5 via network interfaces 456b. The network interfaces typically include a base station to core network interface (e.g. an S1-U interface) for communicating with the core network and one or more base station to base station interfaces (e.g. Xn/X2 interfaces) for communicating with other base stations (e.g. the MeNB 5-1 and/or other gNBs). The central unit 5-2b transceiver circuitry 451b is also operable to transmit signals to and to receive signals from one or more distributed units 5-2b via an interface 454b (e.g. the F1 interface).

Each unit 5-2a, 5-2b includes a respective controller 457a, 457b which controls the operation of the corresponding transceiver circuitry 451a, 451b in accordance with software stored in the respective memories 459a and 459b of the distributed unit 5-2a and the central unit 5-2b. The software of each unit includes, among other things, a respective operating system 461a, 461b, a respective communications control module 463a, 463b, a respective F1 module 465a, 465b, and a respective UE context management module 473a, 473b. The central unit 5-2b also includes an Xn/X2 Module 467b, a CN interface module 469b and an SgNB operation module 471b. The distributed unit 5-2a also includes an RRC module 468a.

Each communications control module 463a, 463b, is operable to control the communication of its corresponding unit 5-2a, 5-2b including the communication from one unit to the other. The communications control module 463a of the distributed unit 5-2a controls communication between the distributed unit 5-2a and the UEs 3, and the communications control module 463b of the central unit 5-2b controls communication between the central unit 5-2b and any other network entities that are connected to the gNB 5-2 (e.g. the MeNB 5-1).

Each of the communications control modules 463a, 463b also respectively controls the part played by the distributed unit 5-2a and central unit 5-2b in the flow of uplink and downlink user traffic to be transmitted to and received from the UEs 3 served by gNB 5-2 including.

Each communication control module 463a, 463b is responsible, for example, for controlling the respective part played by the distributed unit 5-2a and central unit 5-2b in procedures such as the communication of measurement control/configuration information, system information, the gNBs part in random access channel (RACH) procedures etc. Each communication control module 463a, 463b is also responsible, for example, for controlling the respective part played by the distributed unit 5-2a and central unit 5-2b in managing the gNBs part in the setup, configuration and reconfiguration of gNB to gNB interfaces with neighbouring gNBs. Each communication control module 463a, 463b is also responsible, for example, for controlling the respective part played by the distributed unit 5-2a and central unit 5-2b in managing the gNBs part mobility procedures including making mobility decisions, selecting targets etc. (where applicable).

Each of the F1 modules 465a, 465b is responsible for the management of the traffic over the CU to DU (F1) interface between the distributed unit 5-2a and the central unit 5-2b (under the overall control of the corresponding communications control module 463a, 463b).

The UE context management modules 473a, 473b are responsible setting up, managing and maintaining the UE context between the central unit 5-2b and the distributed unit 5-2a. The UE context management modules 473a, 473b are responsible, for example, for managing (under the overall control of the corresponding communications control module 463a, 463b) UE context related procedures such as, for example, UE Context setup procedures, UE context release procedures, UE context modification procedures and/or the like.

The Xn/X2 Module 467b of the central unit 5-2b is responsible for the management of the gNB's traffic over the base station to base station interface(s) (under the overall control of the communications control module 463b) such as X2 traffic with the MeNB 5-1 in the EN-DC configuration of FIG. 1 (and/or Xn traffic with other gNBs).

The CN interface module 469b of the central unit 5-2b is responsible for the management of the gNB's traffic over the base station to core network interface (under the overall control of the communications control module 463b) such as S1-U traffic between itself and with the EPC 7 in the EN-DC configuration of FIG. 1.

The SgNB operation module 471b of the central unit 5-2b is responsible for managing the operation the gNB 5-2 as a secondary gNB (e.g. when configured as an SgNB in the EN-DC configuration of FIG. 1).

The RRC module 468a of the distributed unit 5-2a 247 is responsible for controlling the RRC layer functionality of the gNB 5-2 and corresponding RRC communication with the UE 3 (under the overall control of the communications control module 463a).

A number of procedures will now be described, by way of example only, which may be implemented to help provide efficient signalling mechanisms having a number of benefits.

SgNB Initiated SgNB Modification

Figure 5:
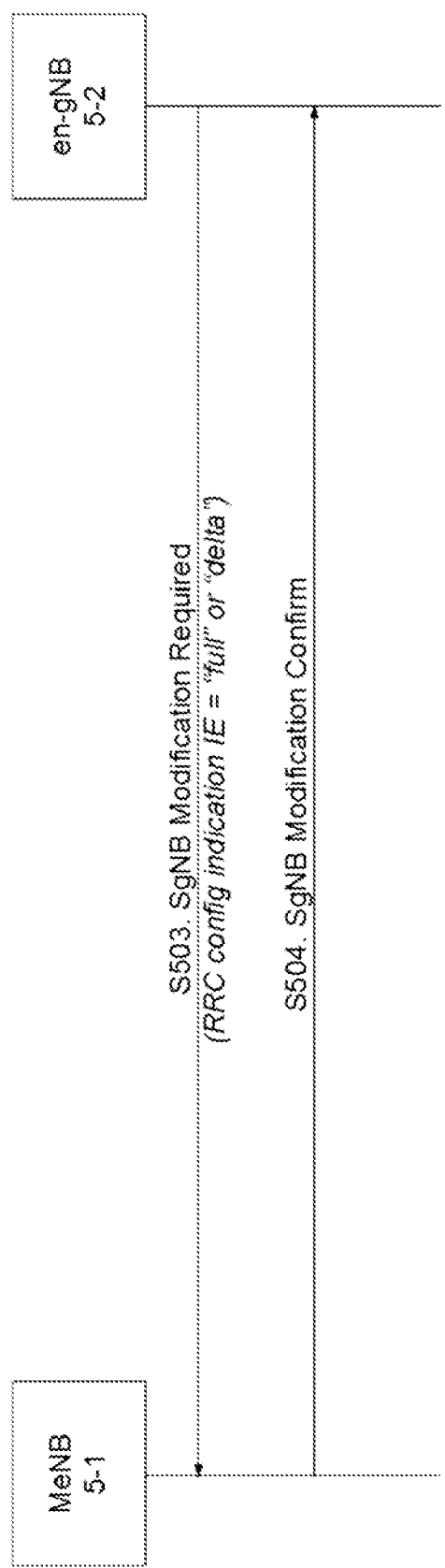
FIG. 5 is a simplified signalling diagram for an SgNB initiated procedure for SgNB modification in an MR-DC scenario.

Reference will now be made to FIG. 5, which is a simplified signalling diagram for an SgNB initiated procedure for SgNB modification in an MR-DC scenario. This procedure may be used, for example, by the en-gNB 5-2 to modify a UE context in the en-gNB 5-2b during inter-DU mobility or the like.

As seen in FIG. 5, in step S503, the en-gNB initiates the procedure by sending a modification required message to the MeNB (in this example an 'SgNB Modification Required' message). This message may include an MeNB to SgNB Container IE carrying new cell group configuration information for a target DU (e.g. in a CG-Config message) in addition to further information elements (IEs).

One such further IE included in the modification required message in the example of FIG. 5, is the indication of the type of RRC configuration used at the en-gNB (i.e. whether the en-gNB applied a 'full' or 'delta' configuration). This IE may, for example, be provided as an RRC config indication IE or the like. If the MeNB is able to perform the change requested by the en-gNB 5-2, the MeNB 5-1 responds with a confirmation message (in this example a SgNB Modification Confirm message) in step S504.

Accordingly, when the en-gNB applies a full configuration, e.g. as part of a mobility procedure involving a change of DU or the like, the en-gNB is able to inform the MeNB by including the RRC configuration indication IE (e.g. set to 'full') in the SgNB Modification Required message.

An example of the information elements that may be included in an SgNB Modification Required message (including the RRC configuration indication IE) in the above procedure is provided in Tables 1-1 and 1-2 below (the references in column 4 referring to 3GPP TS 36.423).

TABLE 1-1

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE XZAP ID 9.2.24 | Allocated at the MeNB. | YES | reject |
| SgNB UE X2AP ID | M | | en-gNB UE X2AP ID 9.2.100 | Allocated at the en-gNB. | YES | reject |
| Cause | M | | 9.2.6 | | YES | ignore |
| PDCP Change Indication | O | | 9.2.109 | | YES | ignore |
| E-RABs To Be Released List | | 0 . . . 1 | | | YES | ignore |
| >E-RABs To Be Released Item | | 1 . . . <maxnoof Bearers> | | | EACH | ignore |
| >>E-RAB ID | M | | 9.2.23 | | — | |
| >>Cause | M | | 9.2.6 | | — | |
| SgNB fo MeNB Container | O | | OCTET STRING | Includes the NR CG-Config message as defined in TS 38.331 [31]. | YES | ignore |
| MeNB UE X2AP ID Extension | O | | Extended eNB UE X2AP ID 9.2.86 | Allocated at the MeNB. | YES | reject |
| E-RABs To Be Modified List | | 0 . . . 1 | | | YES | ignore |
| >E-RABs To Be Modified Item | | 1 . . . <maxnoof Bearers> | | | EACH | ignore |
| >>E-RAB ID | M | | 9.2.23 | | — | |
| >>EN-DC Resource Configuration | M | | EN-DC Resource Configuration 9.2.108 | Indicates the PDCP and Lower Layer MCG/SCG configuration. | — | |
| >>CHOICE Resource Configuration | M | | | | | |
| >>>PDCP present in SN | | | | This choice tag is used if the PDCP at SgNB IE in the EN-DC Resource Configuration IE is set to the value "present". | | |

TABLE 1-2

| | | | | | |
|---|---|---|---|---|---|
| >>>>Requested MCG E-RAB Level QoS Parameters | O | E-RAB Level QoS Parameters 9.2 9 | Includes E-RAB level QoS parameters requested to be provided by the MCG. | — | |
| >>>>UL configuration | O | 9.2.118 | Information about UL usage in the MeNB. | — | — |
| >>>>SgNB UL GTP TEID at PDCP | O | GTP Tunnel Endpoint 9.2.1 | SgNB endpoint of the X2-U transport bearer at PDCP. For delivery of UL PDCP PDUs. | — | |
| >>>>S1 DL GTP TEID at the SgNB | O | GTP Tunnel Endpoint 9.2.1 | en-gNB endpoint of the S1 transport bearer. For delivery of DL PDUs | — | |
| >>>PDCP not present in SN | | | This choice tag is used if the PDCP at SgNB IE in the EN-DC Resource Configuration IE is set to the value "not present". | | |
| >>>>SgNB DL GTP TEID at SCG | O | GTP Tunnel Endpoint 9.2.1 | SgNB endpoint of the X2-U transport bearer at the SCG. For delivery of DL POCP PDUs. | — | |
| >>>>>Secondary SgNB DL GTP TEID at SCG | O | GTP Tunnel Endpoint 9.2.1 | SgNB endpoint of the X2-U transport bearer at the SCG. For delivery of DL PDCP PDUs for PDCP duplication. | — | |
| SgNB Resource Coordination Information | O | 9.2.117 | Information used to coordinate resources utilization between the engNB and the MeNB. | YES | ignore |
| RRC config indication | O | 9.2.x | Indicates the type of RRC configuration used at the en-gNB. | YES | reject |

Details of the 'RRC config indication' IE referred to in Table 1-2 above is provided in Table 2 below:

TABLE 2

| IE/Group Name | Presence | Range | IE type and reference | Semantics description |
|---|---|---|---|---|
| RRC config indication | M | | ENUMERATED (full config, delta config, ... ) | |

MeNB Initiated SgNB Modification Preparation

Figure 6:
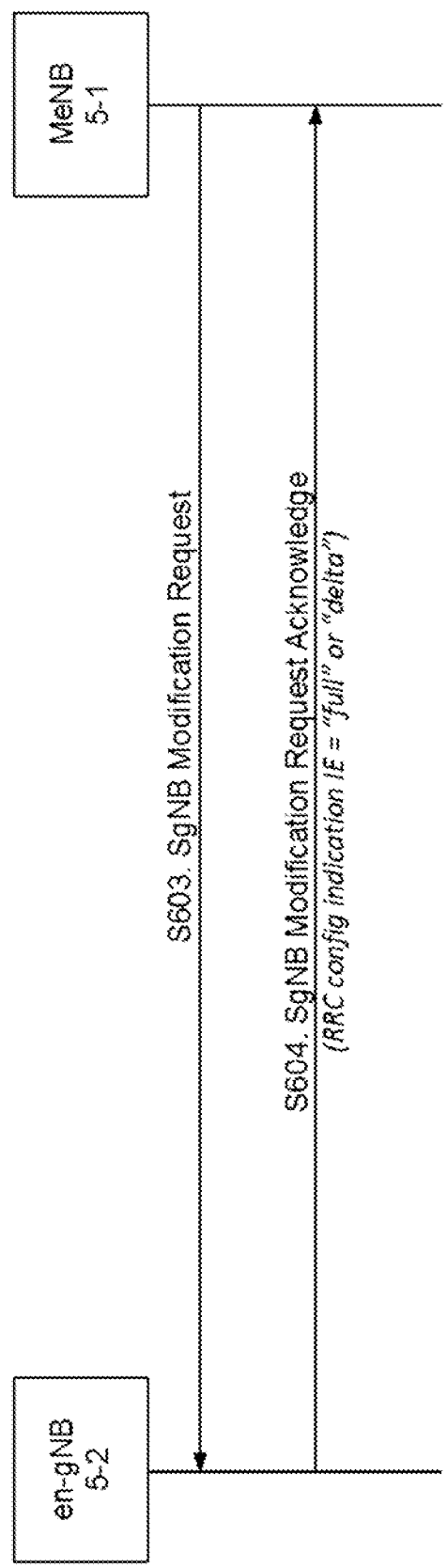
FIG. 6 is a simplified signalling diagram for an MeNB initiated procedure for SgNB modification in an MR-DC scenario.

Reference will now be made to FIG. 6, which is a simplified signalling diagram for an MeNB initiated procedure for SgNB modification in an MR-DC scenario.

This procedure may be used to enable an MeNB to request an en-gNB to modify a UE context at the en-gNB, or to query the current secondary cell group (SCG) configuration for supporting delta signalling in MeNB initiated SgNB change, or to provide the secondary radio link failure (S-RLF) related information to the en-gNB.

As seen in FIG. 6, in step S603, the MeNB 5-1 initiates the procedure by sending a modification request message to the en-gNB 5-2 (in this example an 'SgNB Modification Request' message).

The Men-gNB 5-2 responds with an acknowledge message (in this example an SgNB Modification Request Acknowledge message) in step S604. This message may contain a MeNB to SgNB Container IE carrying new cell group configuration information for a target DU (e.g. in a CG-Config message) in addition to further information elements (IEs). This message may include a further IE, which provides an indication of the type of RRC configuration used at the en-gNB (i.e. whether the en-gNB applied a 'full' or 'delta' configuration). This IE may, for example, be provided as an RRC config indication IE or the like.

Accordingly, when the en-gNB applies a full configuration, e.g. as part of a mobility procedure involving a change of DU, the en-gNB can inform the MeNB by including the RRC configuration indication IE in the SgNB Modification Request Acknowledge message.

An example of the information elements that may be included in an SgNB Modification Request Acknowledge message (including the RRC configuration indication IE) in the above procedure, is provided in Tables 3-1, 3-2, 3-3 and 3-4 below (the references in column 4 referring to 3GPP 36.423).

TABLE 3-1

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB. | YES | ignore |
| SgNB UE X2AP ID | M | | en-gNB UE X2AP ID 9.2.100 | Allocated at the en-QNB. | YES | ignore |
| E-RABs Admitted List | | 0 . . . 1 | | | YES | ignore |
| >E-RABs Admitted To Be Added List | | 1 | | | — | |
| >>E-RABs Admitted To Be Added Item | | 1 . . . <maxnoof Bearers> | | | EACH | ignore |
| >>>E-RAB ID | M | | 9.2.23 | | — | |
| >>>EN-DC Hesource Configuration | M | | EN-DC Resource Configuration 9.2.108 | Indicates the PDCP and Lower Layer MCG/SCG configuration. | — | |
| >>>CHOICE Resource Configuration | M | | | | | |
| >>>>PDCP present in SN | | | | This choice tag is used if the PDCP at SgNB IE in the EN-DC Resource Configuration IE is set to the value "present". | | |
| >>>>>S1 DL GTP TEID at the SgNB | M | | GTP Endpoint 9.2.1 | SgNB endpoint of the S1 transport bearer. For delivery of DL PDUs. | — | |
| >>>>>SgNB UL GTP TEID at PDCP | C-ifMCGpresent | | GTP Tunnel Endpoint 9.2.1 | SgNB endpoint of the X2-U transport bearer at PDCP. For delivery of UL PDCP PDUs. | — | |
| >>>>>RLC Mode | C-ifMCGpresent | | RLC Mode 9.2.119 | Indicates the RLC mode. | | |

TABLE 3-2

| | | | | | | |
|---|---|---|---|---|---|---|
| >>>>>DL Forwarding GTP Tunnel Endpoint | O | | GTP Tunnel Endpoint 9.2.1 | Identifies the X2 transport bearer used for forwarding of DL PDUs. | — | |
| >>>>>UL Forwarding GTP Tunnel Endpoint | O | | GTP Tunnel Endpoint 9.2.1 | Identifies the X2 transport bearer used for forwarding of UL PDUs. | — | |
| >>>>>Requested MCG E-RAB Level QoS Parameters | C-ifMCGandSCGpresent_GBRpresent | | E-RAB Level QoS Parameters 9.2.9 | Includes E-RAB level QoS parameters requested to be provided by the MCG. | — | |
| >>>>>UL configuration | C-ifMCGandSCGpresent. | | 9.2.118 | Information about UL usage in the MeNB. | — | |
| >>>>PDCP not present in SN | | | | This choice tag is used if the PDCP at SgNB IE in the EN-DC Resource Configuration IE is set to the value "not present". | | |
| >>>>>SgNB DL GTP TEID at SCG | M | | GTP Tunnel Endpoint 9.2.1 | Endpoint of the X2-U transpon bearer at the SCG. For delivery of DL PDCP PDUs. | — | — |

TABLE 3-2-continued

| | | | | | | |
|---|---|---|---|---|---|---|
| >>>>>Secondary SgNB DL GTP TEID at SCG | O | | GTP Tunnel Endpoint 9.2.1 | Endpoint of the X2-U transport bearer at the SCG. For delivery of DL PDCP PDUs in case of PDCP duplication. | — | — |
| >E-RABs Admitted To Be Modified List | | 0 . . . 1 | | | — | |
| >>E-RABs Admitted To Be Modified Item | | 1 . . . <maxnoof Bearers> | | | EACH | ignore |
| >>>E-RAB ID | M | | 9.2.23 | | — | |
| >>>EN-DC Resource Configuration | M | | EN-DC Resource Configuration 9.2.108 | Indicates the PDCP and Lower Layer MCG/SCG configuration. | — | |

TABLE 3-3

| | | | | | | |
|---|---|---|---|---|---|---|
| >>>CHOICE Resource | M | | | | | |
| >>>>PDCP present in SN | | | | This choice tag is used if the PDCP at SgNB IE in the EN-DC Resource Configuration IE is set to the value "present". | | |
| >>>>>S1 DL GTP Tunnel Endpoint | O | | GTP Tunnel Endpoint 9.2.1 | SgNB endpoint of the S1 transport bearer. For delivery of DL PDUs. | — | |
| >>>>>SgNB UL GTP TEID at PDCP | O | | GTP Tunnel Endpoint 9.2.1 | SgNB endpoint of the X2-U transport bearer at PDCP. For delivery of UL PDCP PDUs. | — | |
| >>>>>Requested MCG E-RAB Level Qos Parameters | O | | Level QoS Parameters 9.2.9 | Includes E-RAB level QoS parameters requested to be provided by the MCG. | — | |
| >>>>>UL configuration | O | | 9.2.118 | Information about UL usage in the MeNB. | — | — |
| >>>>PDCP not present in SN | | | | This choice tag is used if the PDCP at SgNB IE in the EN-DC Resource Configuration IE is set to the value "not present". | | |
| >>>>>SgNB DL GTP TEID at SCG | O | | GTP Tunnel Endpoint 9.2.1 | SgNB endpoint of the X2-U transport bearer at the SCG. For delivery of DL PDCP PDUs. | — | |
| >>E-RABs Admitted To Be Released List | | 0 . . . 1 | | | — | |
| >>E-RABs Admitted To Be Released Item | | 1 . . . <maxnoof Bearers> | | | EACH | ignore |
| >>>ERAB ID | M | | 9.2.33 | | — | |
| >>>EN-DC Resource Configuration | M | | EN-DC Resource Configuration 9.2.108 | Indicates the PDCP and Lower Layer MCG/SCG configuration. | — | |

TABLE 3-4

| | | | | | |
|---|---|---|---|---|---|
| >>>CHOICE Resource Configuration | M | | Note: no further information contained in the IE container | | |
| E-RABs Not Admitted List | O | E-RAB List 9.2.28 | A value for E-RAB ID shall only be present once in E-RABs Admitted List IE and in E-RABs Not Admitted List IE. | YES | ignore |
| SgNB to MeNB Container | O | OCTET STRING | Includes the NR CG-Config message as defined in TS 38.331 [31]. | YES | ignore |
| Criticality Diagnostics | O | 9.2.7 | | YES | ignore |
| MeNB UE X2AP ID Extension | O | Extended eNB UE X2AP ID 9.2.86 | Allocated at the MeNB. | YES | ignore |
| SgNB Resource Coordination Information | O | 9.2.117 | Information used to coordinate resources utilisation between en-gNB and MeNB. | YES | ignore |
| Admitted split SRBS | O | ENUMERATED (srb1, srb2, srb1&2, . . . ) | Indicates admitted SRBs | YES | ignore |
| Admitted split SRBs release | O | ENUMERATED (srb1, srb2, srb1&2, . . . ) | Indicates admitted SRBs release | YES | ignore |
| RRC config indication | O | 9.2.x | Indicates the type of RRC configuration used at the en-gNB. | YES | ignore |

Details of the 'RRC config indication' IE referred to in Table 3-4 above is provided in Table 4 below.

TABLE 4

| IE/Group Name | Presence | Range | IE type and reference | Semantics description |
|---|---|---|---|---|
| RRC config indication | M | | ENUMERATED (full config, delta config, . . . ) | | gNB-CU Initiated Mobility

Figure 7:
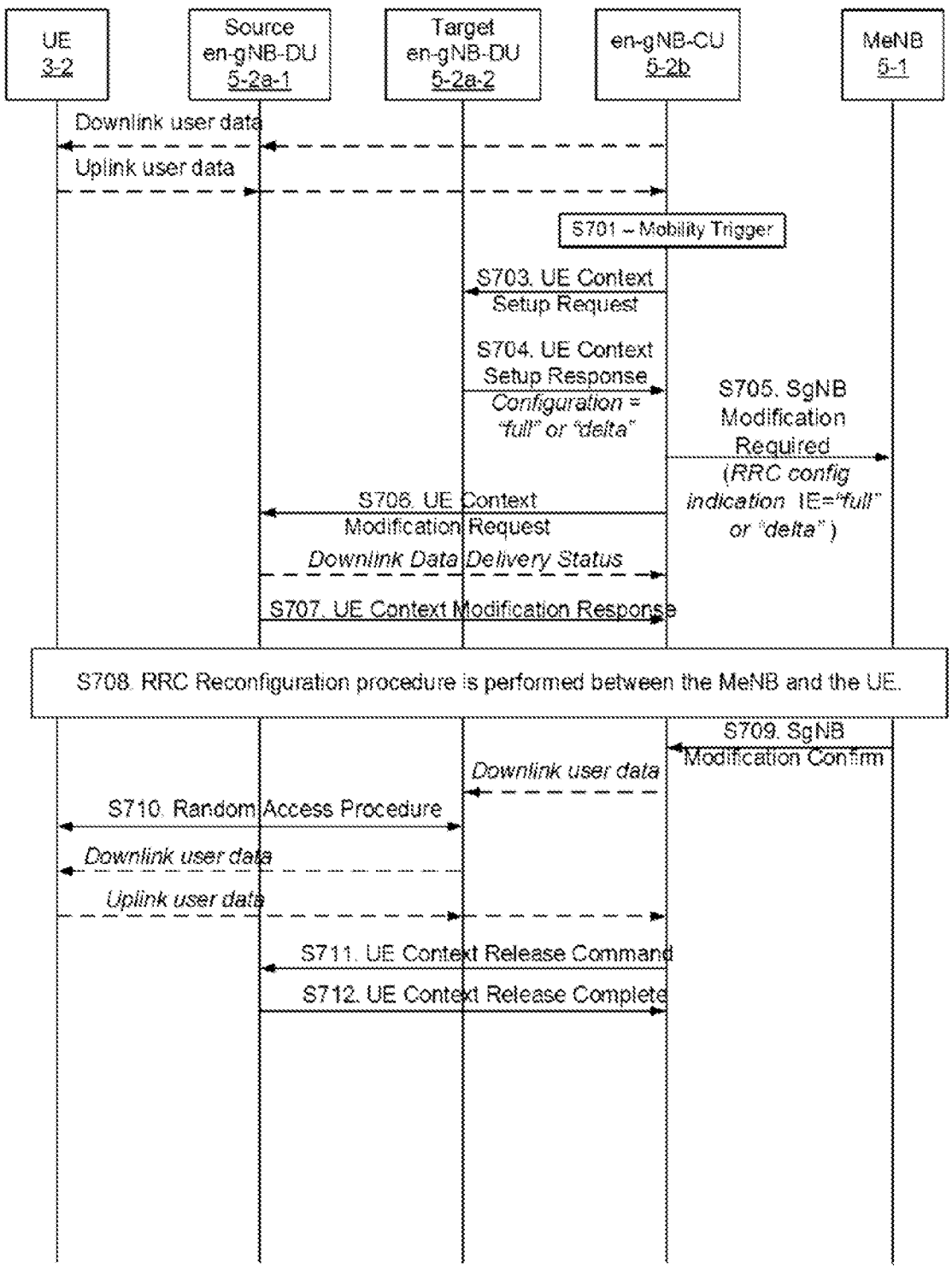
FIG. 7 is a simplified signalling diagram for an SgNB initiated inter-gNB-DU mobility procedure.

Reference will now be made to FIG. 7, which is a signalling diagram illustrating the steps which occur during a gnB-CU initiated inter-gNB-DU mobility procedure (known as an 'SN initiated SN modification' procedure), that incorporates a procedure similar to that outlined briefly above with respect to FIG. 5, for changing a DU serving a given UE. It will be appreciated that this procedure uses UE-associated signalling.

Initially, it can be seen that the UE 3-2 is in communication, in downlink and in uplink, with the en-gNB-CU 5-2b via the source en-gNB-DU 5-2a-1.

In step S701, the en-gNB-CU 5-2b triggers a mobility procedure to transfer the UE context to a different (target) en-gNB-DU 5-2a-2. The en-gNB-CU 5-2b sends, in step S703, a UE Context Setup Request message, over the F1 interface, to the target en-gNB-DU 5-2a-2. This message is used to initiate creation of the UE context at the target en-gNB-DU 5-2a-2 and is responsible for the setup of one or more radio bearers. The target en-gNB-DU 5-2a-2 responds, in step S704, with a UE Context Setup Response message which contains an indication of the type of RRC configuration used, which may be 'full' or 'delta'.

On receipt of this indication, in step S705, the en-gNB-CU 5-2b transmits a modification required message (e.g. the X2AP 'SgNB Modification Required' message) to the MeNB which includes the indication received in step S704 in a corresponding information element (IE) (e.g. the RRC config indication IE).

Once the modification required message has been sent, the en-gNB-CU 5-2b proceeds in step S706 to send a UE context modification request message to the source en-gNB-DU 5-2a-1, indicating to stop the data transmission to the UE 3-2. The source en-gNB-DU 5-2a-1 then sends a Downlink Data Delivery Status frame to the en-gNB-CU 5-2b, to inform the en-gNB-CU about the unsuccessfully transmitted downlink data to the UE. The source en-gNB-DU proceeds to send, in step S707, a UE Context Modification Response message to the en-gNB-CU 5-2b. Then, it is possible for the MeNB 5-1 and the UE 3-2 to perform, in step S708, an RRC Reconfiguration procedure, correctly constructed using the RRC configuration indication IE received earlier in the procedure.

Subsequently, in step S709, the MeNB 5-1 sends an SgNB Modification Confirm message to the en-gNB-CU 5-2b. Downlink packets, which may include data not successfully transmitted in the source en-gNB-DU 5-2b, are then sent to the target e-gNB-DU 5-2a-2, as indicated by the 'downlink user data'. A Random Access procedure is then performed at the target en-gNB-DU 5-2a-2, in step 710. Downlink packets can then be sent to the UE 3-2, as indicated by the 'downlink user data' arrow and uplink packets can sent from the UE 3-2, which are forwarded to the en-gNB-CU 5-2b through the target en-gNB-DU 5-2a-2 as indicated by the 'uplink user data' arrow.

The en-gNB-CU 5-2b then sends, in step S711, a UE Context Release Command message to the source en-gNB-DU 5-2a-1. Finally, the procedure is completed, in step S712, when the source en-gNB-DU 5-2a-1 releases the UE context and responds to the en-gNB-CU 5-2b with an UE Context Release Complete message.

MeNB Initiated Mobility

Figure 8:
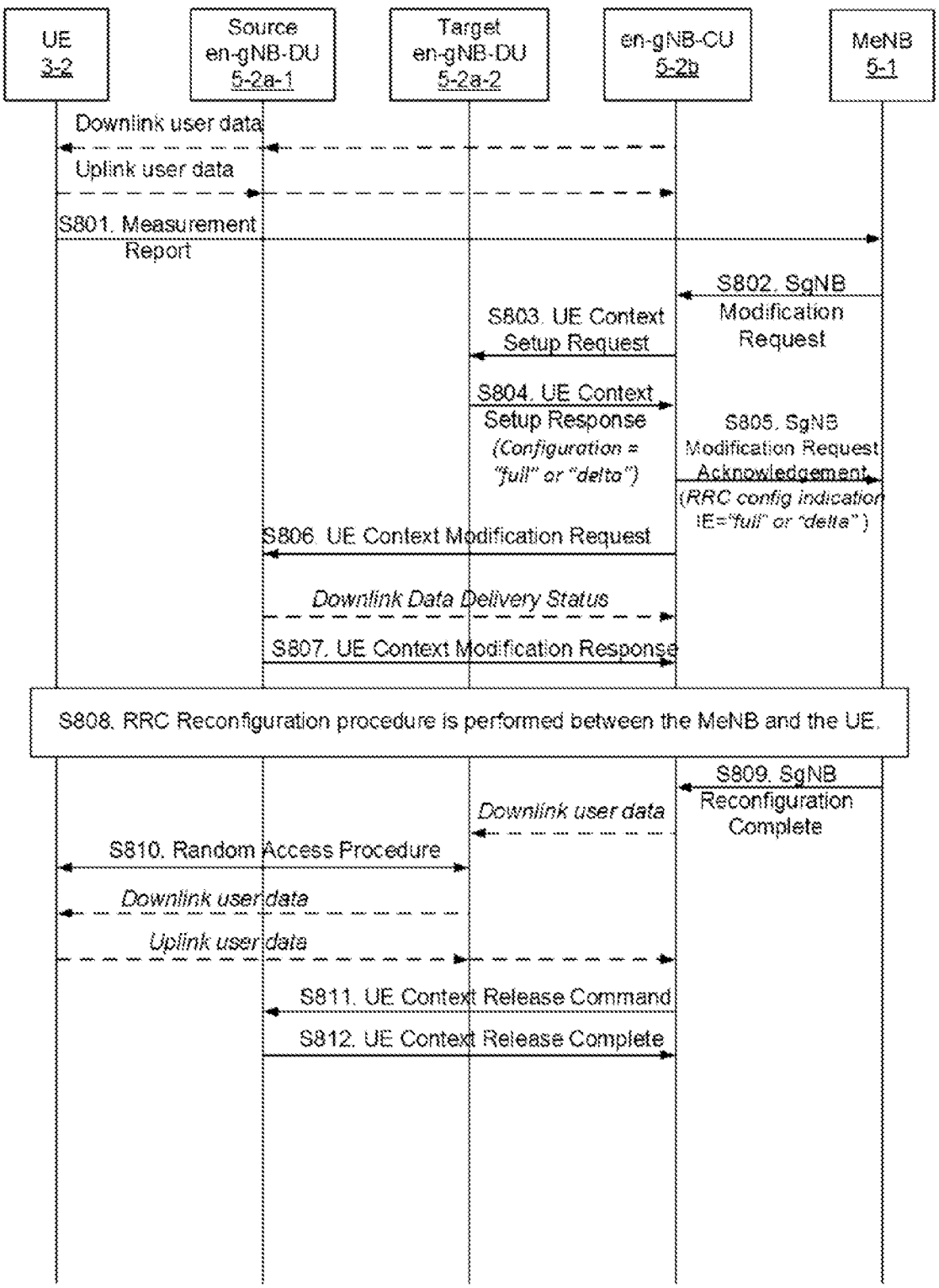
FIG. 8 is a simplified signalling diagram for an MeNB initiated inter-gNB-DU mobility procedure.

Reference will now be made to FIG. 8, which is a signalling diagram illustrating the steps which occur during an MeNB initiated inter-gNB-DU mobility procedure (also known as 'MN initiated SN modification'), that incorporates a procedure similar to that outlined briefly above with respect to FIG. 6, for changing a DU serving a given UE. It will be appreciated that this procedure uses UE-associated signalling.

Initially, it can be seen that the UE is in communication, in downlink and in uplink, with the en-gNB-CU 5-2b via the source en-gNB-DU 5-2a-1.

In step S801, the UE sends a Measurement Report message to the MeNB 5-1.

The MenB decides (e.g. based on the measurement results) to initiate a mobility procedure to transfer the UE 3-2 to a new (target) gnB-DU 5-2a-2. To initiate the mobility procedure, the MeNB 5-1 sends an SgNB Modification Request message to the en-gNB-CU 5-2b in step S802, which consequently triggers a UE Context Setup Request message to be sent, in step S803, over the F1 interface, to the target en-gNB-DU 5-2a-2. This message is used to initiate creation of a UE context at the target gnB-DU 5-2a-2 and is responsible for the setup of one or more radio bearers. The target en-gNB-DU 5-2a-2 responds, in step S804, with a UE Context Setup Request message which contains an indication of the type of RRC configuration used, which may be 'full' or 'delta'.

On receipt of this indication, in step S805, the en-gNB-CU 5-2b transmits a modification request acknowledgement message to the MeNB 5-1 which includes the indication received in step S804 in an information element (IE). This information element may be referred to as an RRC config indication IE. The modification required message may be referred to as a 'SgNB Modification Request Acknowledge message', which may be sent over the X2 interface (e.g. the X2AP interface) and the information element may be referred to as an RRC config indication IE.

Once the modification request acknowledgement message has been sent, the en-gNB-CU 5-2b proceeds in step S806 to send a UE context modification request message to the source en-gNB-DU 5-2a-1, indicating to stop the data transmission to the UE. The source en-gNB-DU 5-2a-1 sends a Downlink Data Delivery Status frame to the en-gNB-CU 5-2b, to inform the en-gNB-CU 5-2b about any unsuccessfully transmitted downlink data to the UE 3-2. The source en-gNB-DU 5-2a-1 sends, in step S807, a UE Context Modification Response message to the en-gNB-CU 5-2b. Then, it is possible for the MeNB and the UE to perform, at step S808, an RRC Reconfiguration procedure, with correctly constructed configuration information based on the setting of RRC config indication IE received earlier in the procedure, even when a full configuration is applied at the target DU.

Subsequently, in step S809, the MeNB 5-1 sends an SgNB Reconfiguration Complete message to the en-gNB-CU 5-2b. Downlink packets, which may include data not successfully transmitted in the source en-gNB-DU 5-2b, are then sent to the target e-gNB-DU 5-2a-2 by the en-gNB-CU 5-2b, as indicated by the 'downlink user data'. A Random Access procedure is then performed at the target en-gNB-DU 5-2a-2, in step S810. Downlink packets can then be sent to the UE 3-2, as indicated by the 'downlink user data' arrow and uplink packets can sent from the UE 3-2, which are forwarded to the en-gNB-CU 5-2b through the target en-gNB-DU 5-2a-2 as indicated by the 'uplink user data' arrow.

The en-gNB-CU 5-2b then sends, in step S811, a UE Context Release Command message to the source en-gNB-DU 5-2a-1. Finally, the procedure is completed, in step S812, when the source en-gNB-DU 5-2a-1 releases the UE context and responds to the en-gNB-CU 5-2b with an UE Context Release Complete message.

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

For example, the signalling mechanisms and associated indications used in the above-described example embodiments may be implemented in other MR-DC scenarios. For instance, if the above signalling methodology were applied to the NE-DC/NGEN-DC, the skilled person would appreciate that the corresponding messages in the Xn interface may be modified because the MN in this type of MR-DC scenario is connected to the 5GC. Specifically, the RRC configuration indication IE may be included in an 'XnAP: S-Node Modification Required' message and an 'XnAP: S-Node Modification Request Acknowledge' message In an analogous manner, if in the case of intra-NR-DC, i.e. a dual connectivity scenario where both the MN and SN are 5G base stations, a similar signalling method would apply because of the Xn interface which exists between those base stations. For example appropriate Xn messages such as an 'XnAP: SgNB Modification Required' message (or the like) and an 'XnAP: SgNB/S-node Modification Request Acknowledge' (or the like) message could both include the RRC config indication IE.

Moreover, whilst the above description describes that either full or delta configuration information may be provided by a distributed unit in an appropriate IE, it will be appreciated that a second IE may be provided so that both full and delta configuration information may be provided in different respective IEs. For example, an F1AP message containing a DU to CU Information IE may be adapted to include a new IE, e.g. a secondary DU to CU Information IE, which could include the full configuration and which might be included in the message when the other DU to CU Information IE contains a delta configuration. Another option for duplicating the relevant IEs is to do so within the DU to CU Information IE, for example, by adding a secondary cell group configuration information IE within an existing DU to CU Information IE. Beneficially, with this variant method, a DU can provide both a delta configuration and a full configuration at the same time. In this context, a further IE may be introduced in CU to DU signalling messages where appropriate, to indicate whether only a delta configuration, only a full configuration, or both a delta configuration and a full configuration are required. Alternatively or additionally, the conditions for including either one, or both, full and delta configurations in a given message may be fully or partially pre-programmed into the communication entity (e.g. DU or CU that provides them) and specified in the relevant standard.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

The above example embodiments are also applicable to 'non-mobile' or generally stationary user equipment.

Various other modifications will be apparent to those skilled in the art and will not be described in further detail here.

In summary it can be seen that in one example described herein there is presented, a method performed by a central unit of a distributed base station apparatus in a cellular communication system, as part of a change of a user equipment, 'UE', context from a source distributed unit of the distributed base station apparatus to a target distributed unit of the distributed base station apparatus, the method comprising: sending, to the target distributed unit of the distributed base station apparatus, a first message; receiving, from the target distributed unit of the distributed base station apparatus, a second message that includes at least one information element, 'IE', comprising configuration information for the target distributed unit, wherein the at least one information element comprises at least one of: full configuration information for a current configuration applied at the target distributed unit; and delta configuration information for a current configuration applied at the target distributed unit, the delta configuration information representing changes between the current configuration applied at the target distributed unit and another configuration; and sending, to a further base station apparatus, a third message containing the received configuration information for the target distributed unit and an indication of whether a full or a delta type of configuration, has been used.

The third message may include the indication in a radio resource control, RRC, indication IE. The method may further comprise making a decision to modify the UE context to the target distributed unit and sending the first message following said decision. The distributed base station apparatus may comprise secondary base station apparatus and the further base station apparatus may comprise master base station apparatus, wherein the third message may comprise a message to indicate that a modification for a secondary base station apparatus is required. The third message may be an SgNB Modification Required message (e.g. sent over an X2 interface). The third message may be an S-Node Modification Required message (e.g. sent over an Xn interface).

The method may further comprise receiving a request message from the further base station apparatus to modify a UE context at the distributed base station apparatus and the sending of the first message may be performed following receipt of said request from the further base station apparatus.

The distributed base station apparatus may comprise secondary base station apparatus and the further base station apparatus may comprise master base station apparatus, wherein the request message from the further base station may comprise a message to indicate that a modification for a secondary base station apparatus is requested, and the third message may comprise a corresponding message to acknowledge the request message.

The third message may be an SgNB Modification Request Acknowledge message (e.g. sent over an X2 interface). The request message from the further base station may be an SgNB Modification Request message (e.g. sent over an X2 interface). The third message may be an S-Node Modification Request Acknowledge message (e.g. sent over an Xn interface). The request message from the further base station may be an S-Node Modification Request message (e.g. sent over an Xn interface).

The distributed base station apparatus may comprise a fifth generation, 5G, base station, gNB, that operates according to 5G standards.

The distributed base station apparatus may be operating as a secondary node, SN, apparatus.

The further base station apparatus may comprise a fourth generation, 4G, base station, eNB, that operates according to 4G standards.

The further base station apparatus may operate as a master node, MN, apparatus.

In another example described herein there is presented a method performed by a base station apparatus of a cellular communication system, as part of a procedure to change a user equipment, 'UE', context from a source distributed unit of a distributed base station apparatus to a target distributed unit of the distributed base station apparatus, the method comprising: receiving, from the target distributed unit, a message containing configuration information for the target distributed unit and an indication of whether a full or a delta type of configuration, has been used; and performing a reconfiguration procedure, with the UE, using the received configuration information and the indication.

In another example described herein there is presented a central unit of a distributed base station apparatus in a cellular communication system, the central unit comprising: means for sending, as part of a change of a user equipment, 'UE', context from a source distributed unit of the distributed base station apparatus to a target distributed unit of the distributed base station apparatus, to the target distributed unit of the distributed base station apparatus, a first message; means for receiving, from the target distributed unit of the distributed base station apparatus, a second message that includes at least one information element, 'IE', comprising configuration information for the target distributed unit, wherein the at least one information element comprises at least one of: full configuration information for a current configuration applied at the target distributed unit; and delta configuration information for a current configuration applied at the target distributed unit, the delta configuration information representing changes between the current configuration applied at the target distributed unit and another configuration; and means for sending, to a further base station apparatus, a third message containing the received configuration information for the target distributed unit and an indication of whether a full or a delta type of configuration, has been used.

In another example described herein there is presented a base station apparatus, for a cellular communication system, wherein the base station apparatus comprises: means for receiving during a procedure to change a user equipment, 'UE', context from a source distributed unit of a distributed base station apparatus to a target distributed unit of the distributed base station apparatus, from the target distributed unit, a message containing configuration information for the target distributed unit and an indication of whether a full or a delta type of configuration, has been used; and means for performing a reconfiguration procedure, with the UE, using the received configuration information.

In the above example embodiments, a number of software modules were described. As those skilled in the art will appreciate, the software modules may be provided in compiled or un-compiled form and may be supplied to the UE, the base station, as a signal over a computer network, or on a recording medium. Further, the functionality performed by part or all of this software may be performed using one or more dedicated hardware circuits. However, the use of software modules is preferred as it facilitates the updating of the UE, the base station, in order to update their functionalities.

This application is based upon and claims the benefit of priority from United Kingdom Patent Application No. 1810341.6, filed on Jun. 22, 2018, the disclosure of which is incorporated herein in its entirety by reference.

The invention claimed is:

1. A central unit of a distributed base station which is according to a second radio access technology (RAT) and which provides Dual Connectivity to a User Equipment (UE), together with a base station according to a first RAT, the central unit comprising:
　a memory storing instructions; and
　at least one processor configured to process the instructions to:
　　transmit, to a target distributed unit of the distributed base station, a context setup request message for a context of the UE,
　　receive, from the target distributed unit of the distributed base station, a context setup response message including information indicating whether full configuration of the context is used, and
　　transmit, to the base station, a message including a Radio Resource Control (RRC) configuration indication information element indicating which of the full configuration or a delta configuration of the context is applied to.

2. A method for a central unit of a distributed base station which is according to a second radio access technology (RAT) and which provides Dual Connectivity to a User Equipment (UE), together with a base station according to a first radio access technology, the method comprising:
　transmitting, to a target distributed unit of the distributed base station, a context setup request message for a context of the UE;
　receiving, from the target distributed unit of the distributed base station, a context setup response message including information indicating whether full configuration of the context is used; and
　transmitting, to the base station, a message including a Radio Resource Control (RRC) configuration indication information element indicating which of the full configuration or a delta configuration of the context is applied to.

3. The method according to claim 2, wherein
the message includes a modification required message or a modification request acknowledge message.

4. The method according to claim 2, wherein
the first RAT is Long Term Evolution (LTE) or 4th generation (4G) or New Radio (NR) or 5th generation (5G), and
the second RAT is the NR or the 5G.

* * * * *